(12) United States Patent
Kondo et al.

(10) Patent No.: US 8,451,288 B2
(45) Date of Patent: May 28, 2013

(54) IMAGE SIGNAL PROCESSING APPARATUS

(75) Inventors: Tetsujiro Kondo, Tokyo (JP); Tomohiro Yasuoka, Tokyo (JP)

(73) Assignee: Sony Corporation, Tokyo (JP)

( * ) Notice: Subject to any disclaimer, the term of this patent is extended or adjusted under 35 U.S.C. 154(b) by 830 days.

(21) Appl. No.: 12/517,203

(22) PCT Filed: Dec. 18, 2007

(86) PCT No.: PCT/JP2007/074262
§ 371 (c)(1),
(2), (4) Date: Jun. 2, 2009

(87) PCT Pub. No.: WO2008/075660
PCT Pub. Date: Jun. 26, 2008

(65) Prior Publication Data
US 2010/0066757 A1    Mar. 18, 2010

(30) Foreign Application Priority Data

Dec. 18, 2006 (JP) .................................. 2006-340080
Feb. 23, 2007 (JP) .................................. 2007-043160

(51) Int. Cl.
| G09G 5/00 | (2006.01) |
| G09G 5/02 | (2006.01) |
| G09G 5/36 | (2006.01) |
| G09G 3/10 | (2006.01) |
| H04N 17/00 | (2006.01) |
| H04N 5/45 | (2011.01) |
| H04N 1/46 | (2006.01) |
| G06K 9/40 | (2006.01) |
| G06K 15/00 | (2006.01) |

(52) U.S. Cl.
USPC ........... 345/596; 345/581; 345/599; 345/691; 345/694; 345/37; 348/571; 348/574; 358/3.13; 358/501; 358/534; 382/245; 382/274

(58) Field of Classification Search
CPC ... G09G 5/00; G09G 5/02; G06T 11/00; G06K 9/54
USPC ......... 345/581, 596, 599, 475, 204, 690–691, 345/694, 37, 56, 61, 66, 89; 348/571, 574, 348/575, 739; 358/1.9, 3.01, 3.13–3.14, 358/3.06, 501, 534, 536; 382/169, 254, 274, 382/276
See application file for complete search history.

(56) References Cited

U.S. PATENT DOCUMENTS

| 6,310,588 B1 | 10/2001 | Kawahara et al. |
| 7,950,299 B2 * | 5/2011 | Burgkart ........................ 74/1 R |

(Continued)

FOREIGN PATENT DOCUMENTS

| JP | 08-076741 A | 3/1996 |
| JP | 11 38944 | 2/1999 |

(Continued)

OTHER PUBLICATIONS

Toda, K. et al., "Color Disturbance and Dynamic False Contour Observed in Moving Images of PDP", The Institute of Electronics, Information and Communication Engineers, vol. 95, No. 526, pp. 67-72, (1996) (with English translation).

(Continued)

*Primary Examiner* — Wesner Sajous
(74) *Attorney, Agent, or Firm* — Oblon, Spivak, McClelland, Maier & Neustadt, L.L.P.

(57) ABSTRACT

The present invention relates to an image signal processing apparatus capable of reproducing the appearance of an image that is displayed on a PDP. In an image processing unit 1, as a process for an image signal so that an image obtained when the image signal is displayed on a display apparatus of a display type other than that of a PDP can look like an image displayed on a PDP display apparatus, at least one of reproducing color shift caused by a moving image which is produced because lighting of RGB is turned on in this order, reproducing a dither pattern to be applied in a space direction, reproducing a dither pattern to be applied in a time direction, reproducing a space between pixel pitches, and reproducing a stripe array is performed. The present invention can be applied to a case where, for example, an image that can look like an image displayed on a PDP is to be displayed on an LCD.

12 Claims, 18 Drawing Sheets

U.S. PATENT DOCUMENTS

2004/0169732 A1 9/2004 Weitbruch et al.
2005/0276502 A1* 12/2005 Brown et al. ................. 382/254

FOREIGN PATENT DOCUMENTS

| JP | 11-212517 A | 8/1999 |
| JP | 11 231827 | 8/1999 |
| JP | 2000-250439 | 9/2000 |
| JP | 2000-310987 A | 11/2000 |
| JP | 2001-83926 A | 3/2001 |
| JP | 2001-296831 | 10/2001 |
| JP | 2001-306018 | 11/2001 |
| JP | 2002-199248 | 7/2002 |
| JP | 2007-110327 | 4/2007 |
| WO | 03 001493 | 1/2003 |

OTHER PUBLICATIONS

Kondo, T. et al. "Evaluation of Moving Image Quality of Field-Sequential Color Display by a Simulation", Proceedings of the 2000 IEICE General Conference, p. 57, (2000), (with English translation).

Office Action issued Dec. 13, 2011, in European Patent Application No. 07850750.6.

Muge Wang, et al., "Prediction of the texture visibility of color halftone patterns", Journal of Electronic Imaging, vol. 11, No. 2, Apr. 2002, XP 1115912, pp. 195-205.

Taiichiro Kurita, "17.1: Invited Paper: Desirable Performance and Progress of PDP and LCD Television Displays on Image Quality", 2003 SID International Symposium, May 20, 2003, vol. XXXIV, XP 007008238, pp. 776-779.

Office Action issued Jul. 17, 2012 in Japanese Patent Application No. 2007-288456.

Office Action issued Apr. 10, 2012, in Japanese Patent Application No. 2007-221274.

Office Action issued Apr. 12, 2012, in Japanese Patent Application No. 2007-043160 with English translation.

Decision to refuse a European Patent Application issued May 7, 2012, in European Patent Application No. 07 850 750.6.

Japanese Office Action issued May 24, 2004, in Japan Patent Application No. 2007-261601.

Japanese Office Action issued Jun. 21, 2012, in Japan Patent Application No. 2007-043160 (with English translation).

* cited by examiner

FIG. 6

LIGHTING OF BLUE IS TURNED OFF 1/3 EARLIER
IN CASE WHERE MOVING AMOUNT OF TARGET
OBJECT ACCOUNTS FOR THREE PIXELS

| | | | | | |
|---|---|---|---|---|---|
| B | 0.66 | 0.77 | 0.88 | 1 | 1 |
| G | 1 | 1 | 1 | 1 | 1 |
| R | 1 | 1 | 1 | 1 | 1 |

* NUMERICAL VALUES REPRESENT COEFFICIENTS
TO BE MULTIPLIED WITH ORIGINAL PIXEL VALUES AND OUTPUT

FIG. 9
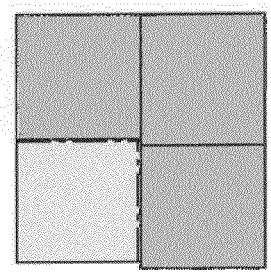
ORIGINAL ONE PIXEL IS ZOOMED TWO-FOLD
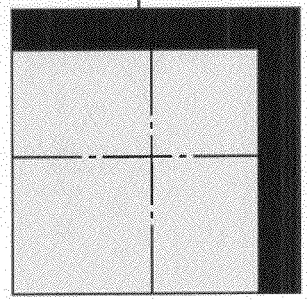
ASSUMING THAT GAP BETWEEN PIXELS IS LOCATED HERE
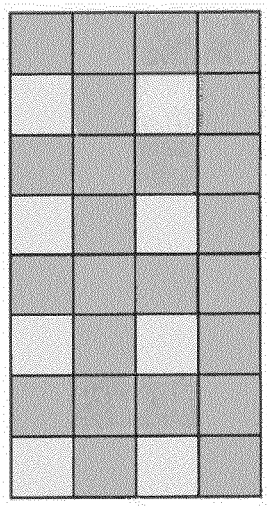
THREE PIXELS ARE RE-INTEGRATED TO REDUCE LUMINANCE
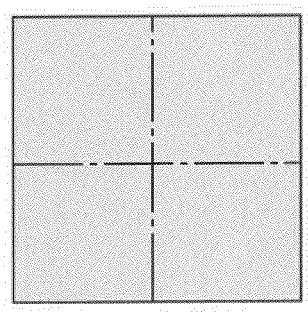
WITH THIS PROCESS, ORIGINAL GRAY MONOCHROMATIC PORTION IS SHOWN IN GRID AS FOLLOWS:
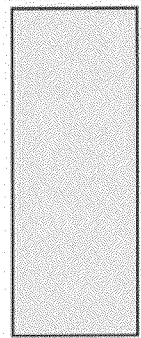

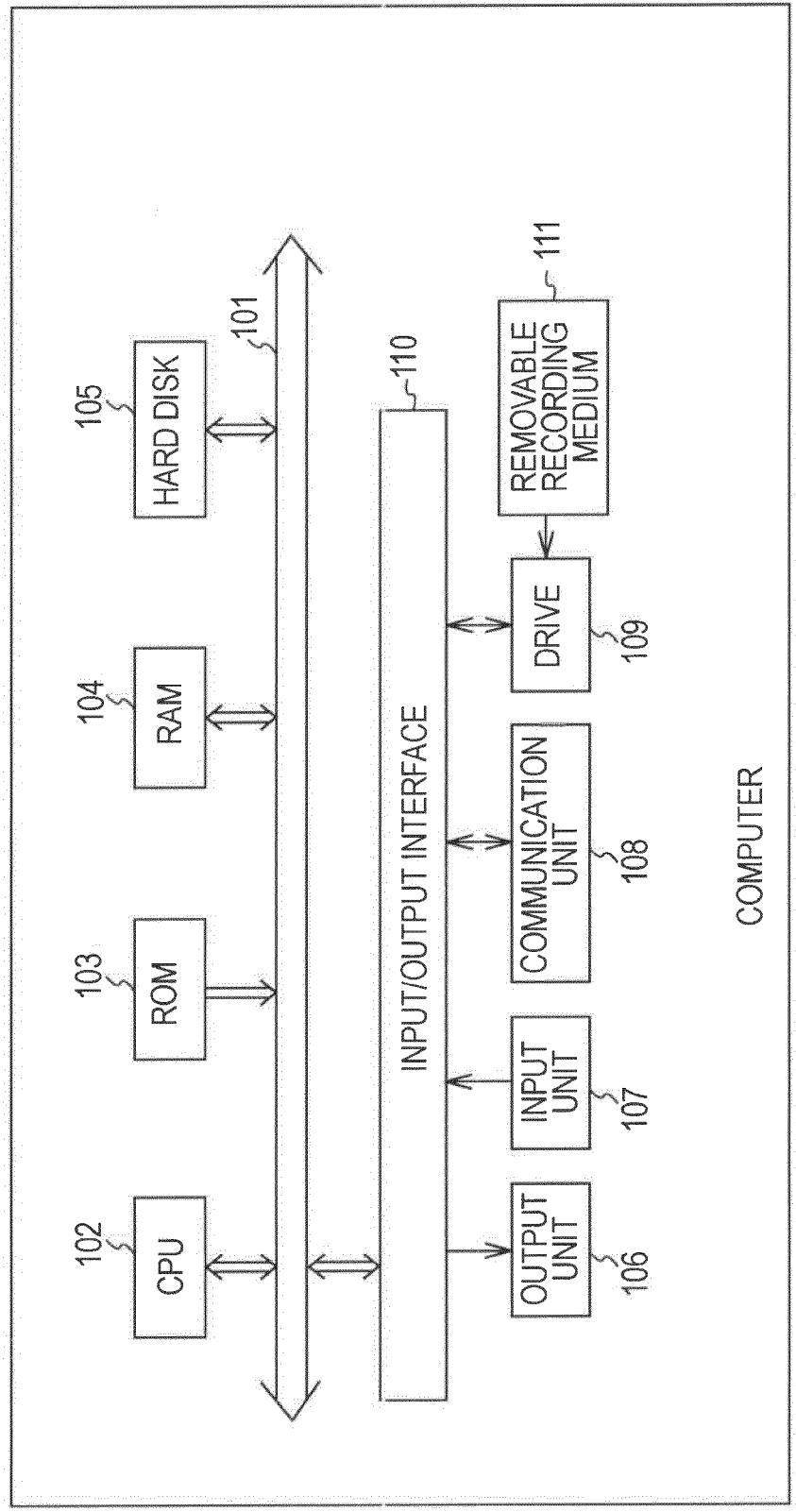

US 8,451,288 B2

IMAGE SIGNAL PROCESSING APPARATUS

TECHNICAL FIELD

The present invention relates to an image signal processing apparatus, and more specifically to an image signal processing apparatus capable of reproducing the appearance of an image on a plasma display (PDP (Plasma Display Panel)) using displays of other devices such as a CRT (Cathode Ray Tube) or an LCD (Liquid Crystal Display) by performing signal processing.

BACKGROUND ART

In a PDP, for example, a stripe rib structure or the like is adopted (see, for example, Non-Patent Document 1). Each pixel is configured such that portions that emit light of R (Red), G (Green), and B (Blue) are arrayed in a stripe pattern.
Non-Patent Document 1: Masayuki KAWAMURA, "Yokuwakaru Purazuma Terebi (Understanding Plasma TV)", Dempa Publications, Inc.

DISCLOSURE OF INVENTION

Technical Problem

Incidentally, in a case where how an image is displayed on a PDP is evaluated, if a monitor such as a CRT or an LCD is used as an evaluation monitor, since a PDP and an LCD or the like have different display characteristics, depending on an image displayed on an LCD, it has been difficult to evaluate the appearance or quality of an image that is (to be) displayed on a PDP.

That is, the image quality of an image that is displayed on an LCD during evaluation and the image quality of an image that is displayed on a PDP during actual viewing on the PDP do not always match.

The present invention has been made in view of such situations, and is to be intended to allow the appearance of an image on a PDP to be reproduced on a display other than the PDP, such as, for example, an LCD, by performing signal processing.

Technical Solution

An aspect of the present invention provides an image signal processing apparatus for processing an image signal so that an image obtained when the image signal is displayed on a display apparatus of a display type other than that of a PDP (Plasma Display Panel) can look like an image displayed on a PDP display apparatus, the image signal processing apparatus including at least one of color shift adding means for reproducing color shift caused by a moving image, the color shift being produced because lighting of RGB (Red, Green, and Bule) is turned on in this order, spatial dither adding means for reproducing a dither pattern to be applied in a space direction, temporal dither adding means for reproducing a dither pattern to be applied in a time direction, inter-pixel pitch reproducing means for reproducing a space between pixel pitches, and stripe array reproducing means for reproducing a stripe array.

In an image signal processing apparatus of an aspect as above, at least one of reproducing color shift caused by a moving image which is produced because lighting of RGB is turned on in this order, reproducing a dither pattern to be applied in a space direction, reproducing a dither pattern to be applied in a time direction, reproducing a space between pixel pitches, and reproducing a stripe array is performed.

Advantageous Effects

According to an aspect of the present invention, it is possible to reproduce the appearance of an image to be displayed on a PDP.

BRIEF DESCRIPTION OF DRAWINGS

FIG. 6 is a diagram illustrating a coefficient to be multiplied with an image signal in a color shift addition process.
FIG. 9 is a diagram explaining an inter-pixel pitch reproduction process.
FIG. 20 is a block diagram illustrating an example structure of an embodiment of a computer to which the present invention is applied.

EXPLANATION OF REFERENCE NUMERALS

1 image processing unit, 2 monitor, 11 magnification/stripe formation circuit, 12 resizing/resampling circuit, 21 current-frame memory, 22 preceding-frame memory, 23 edge portion cutting circuit, 24 motion detecting circuit, 25 color coefficient multiplying circuit, 31 magnification processing circuit, 32 inter-pixel luminance decreasing circuit, 41 smooth-portion extracting circuit, 42 color comparison circuit, 43 spatial dither pattern ROM, 44 dither adding circuit, 51 color comparison circuit, 52 temporal dither pattern ROM, 53 dither adding circuit, 54 to 56 output memory, 60 image processing unit, 61 current-frame memory, 62 preceding-frame memory, 63 edge portion cutting circuit, 64 motion detecting circuit, 65 color coefficient multiplying circuit, 70 image processing unit, 71 color comparison circuit, 72 temporal/spatial dither pattern ROM, 73 dither adding circuit, 74 to 76 output memory, 80 image processing unit, 81 magnification processing circuit, 82 stripe formation circuit, 83 inter-pixel luminance decreasing circuit, 101 bus, 102 CPU, 103 ROM, 104 RAM, 105 hard disk, 106 output unit, 107 input unit, 108 communication unit, 109 drive, 110 input/output interface, 111 removable recording medium

BEST MODE FOR CARRYING OUT THE INVENTION

Embodiments of the present invention will be explained hereinafter with reference to the drawings.

Figure 1:
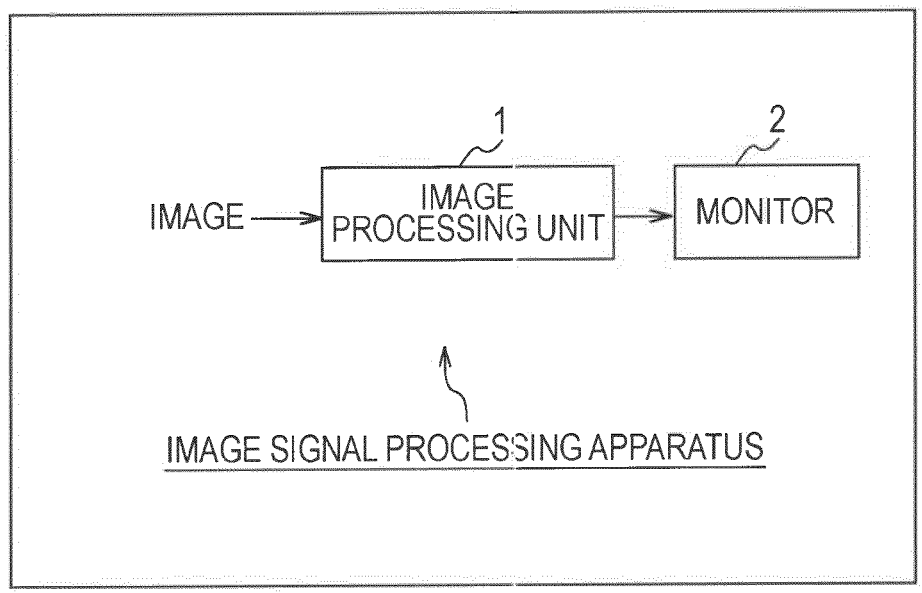
FIG. 1 is a block diagram illustrating an example structure of an embodiment of an image signal processing apparatus to which the present invention is applied.

FIG. 1 illustrates an example structure of an embodiment of an image signal processing apparatus to which the present invention is applied.

In FIG. 1, the image signal processing apparatus is constructed from an image processing unit 1 and a monitor 2. An image signal supplied to the image processing unit 1 is processed so that the image obtained when the image signal is displayed on the monitor 2 serving as a display apparatus of a display type other than that of a PDP can look like an image displayed on a PDP display apparatus, and is displayed on the monitor 2.

That is, the image processing unit 1 subjects the image signal supplied thereto to at least one of a color shift addition process for reproducing color shift caused by a moving image which is produced because lighting of RGB (Red, Green, and Blue) is turned on in this order, a spatial dither addition process for reproducing a dither pattern to be applied in a space direction, a temporal dither addition process for reproducing a dither pattern to be applied in a time direction, an inter-pixel pitch reproduction process for reproducing a space between pixel pitches, and a stripe array reproduction process for reproducing a stripe array, and supplies a resulting image signal to the monitor 2.

The monitor 2 is a display apparatus of a display type other than that of a PDP, that is, for example, a display apparatus of an LCD or a CRT, and displays an image in accordance with the image signal supplied from the image processing unit 1. The monitor 2 displays an image in accordance with the image signal from the image processing unit 1, so that an image that would be displayed on a PDP display apparatus is displayed on the monitor 2.

As described above, in the image processing unit 1, at least one of the color shift addition process, the spatial dither addition process, the temporal dither addition process, the inter-pixel pitch reproduction process, and the stripe array reproduction process is performed.

First, an explanation will be given of the stripe array reproduction process in the color shift addition process, spatial dither addition process, temporal dither addition process, inter-pixel pitch reproduction process, or stripe array reproduction process performed in the image processing unit 1.

Figure 2:
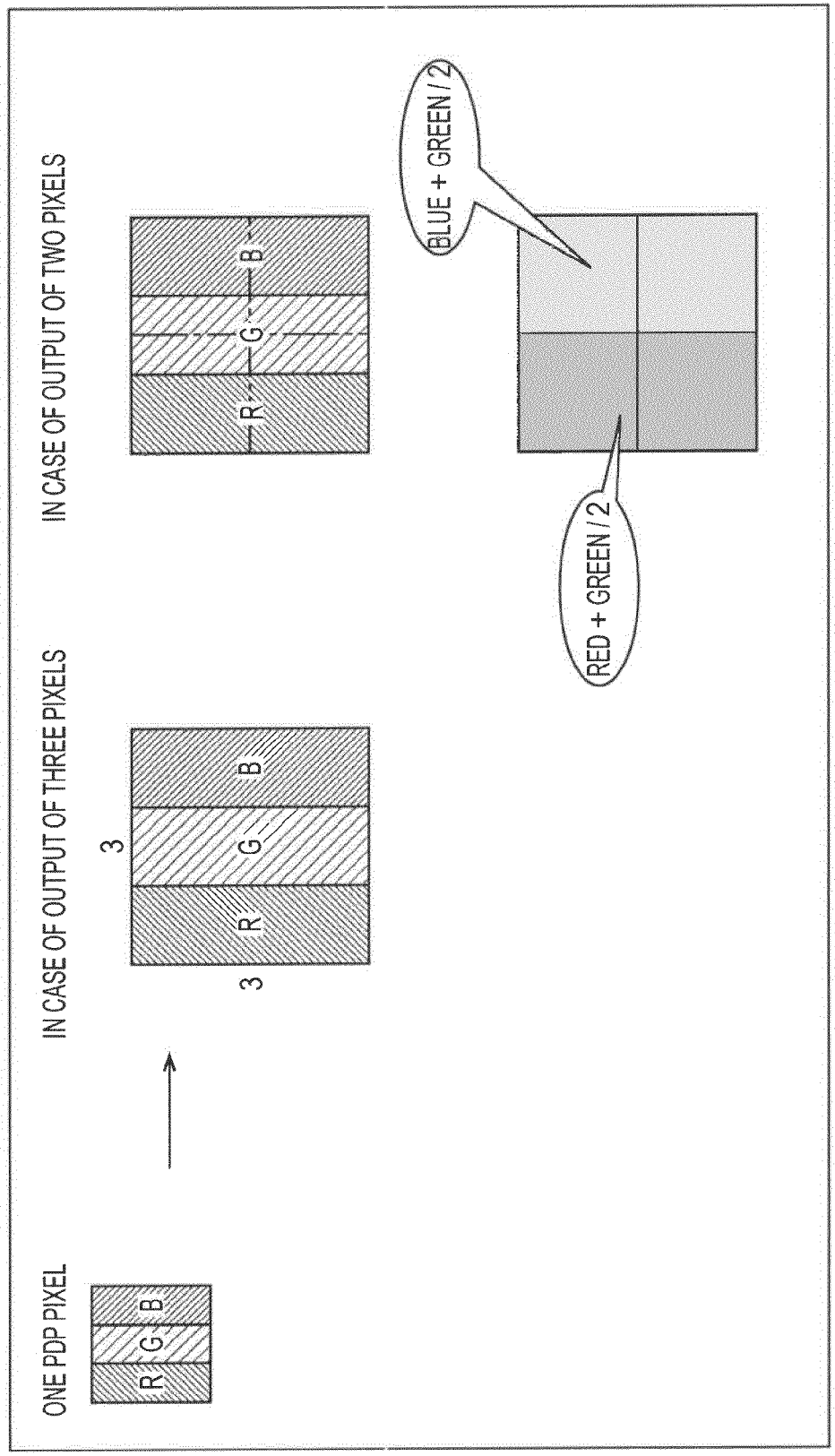
FIG. 2 is a diagram explaining a stripe array reproduction process.

FIG. 2 is a diagram explaining a stripe array reproduction process.

In the stripe array reproduction process, a stripe array, which is unique to PDPs, is reproduced. In an output monitor, two or more pixels are used for displaying of one pixel of a PDP.

In the stripe array reproduction process, each pixel value is decomposed into RGB value components which are arranged longitudinally for display.

In the case of non-multiples of three pixels such as two pixels, similar reproduction can be realized by displaying colors mixed in appearance.

Accordingly, the appearance of stripes, which are unique to PDPs, can also be realized using a liquid crystal monitor or the like.

Also, in some target panels, RGB components do not have equal widths. Changing the widths of RGB components accordingly allows for more improved reproducibility.

Figure 3:
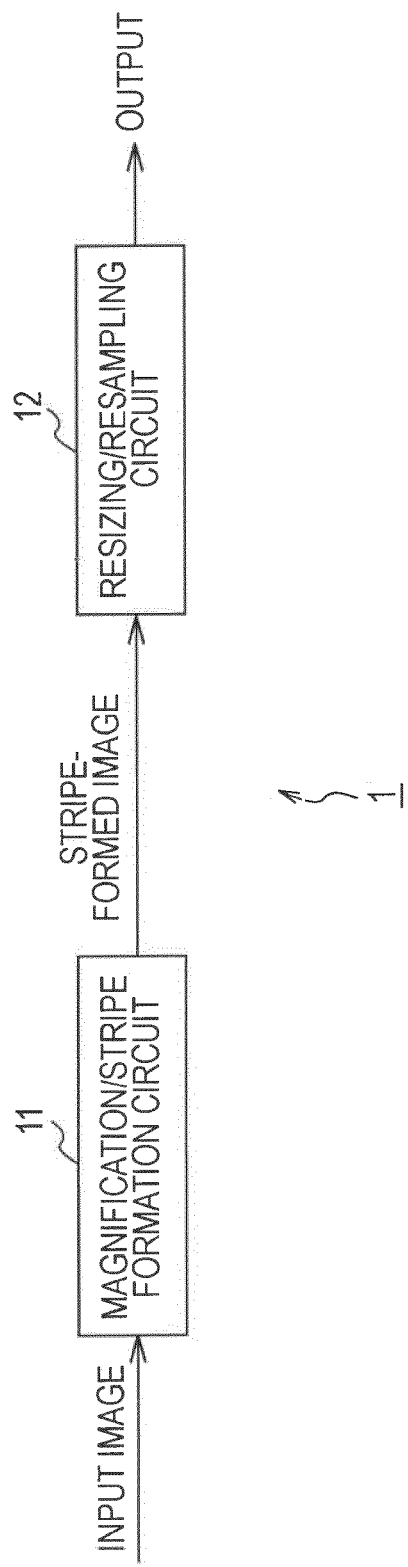
FIG. 3 is a block diagram illustrating an example structure of an image processing unit 1 for performing a stripe array reproduction process.

FIG. 3 illustrates an example structure of an image processing unit 1 for performing the stripe array reproduction process.

A magnification/stripe formation circuit 11 magnifies an image signal supplied to the image processing unit 1 N-fold, that is, for example, three-fold, and decomposes the image signal into an array of stripes. The magnification/stripe formation circuit 11 outputs a stripe-formed image signal.

A resizing/resampling circuit 12 resamples the image signal output from the magnification/stripe formation circuit 11 in accordance with an output image size (the size of an image to be displayed on the monitor 2), and outputs a resulting image signal.

Note that the image signal output from the resizing/resampling circuit 12 is supplied to the monitor 2 and is displayed.

Figure 4:
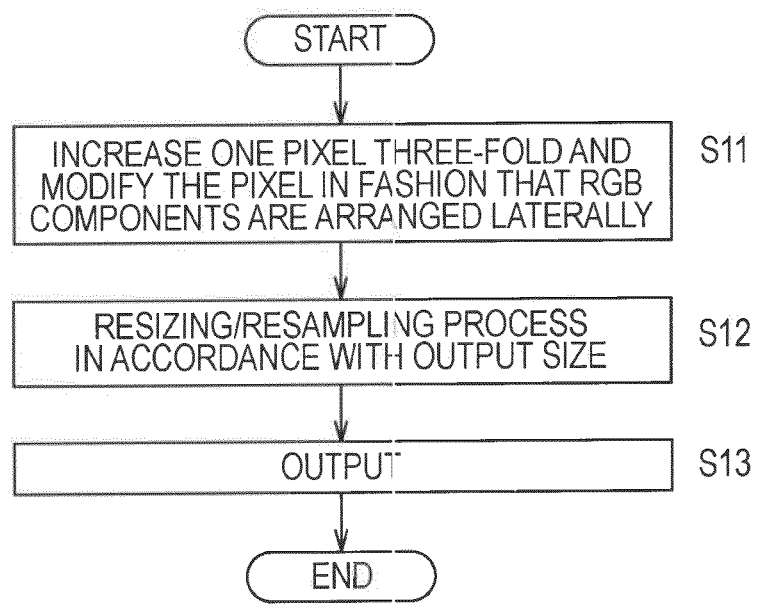
FIG. 4 is a flowchart explaining a stripe array reproduction process.

FIG. 4 is a flowchart explaining the stripe array reproduction process performed in the image processing unit 1 of FIG. 3.

In step S11, the magnification/stripe formation circuit 11 magnifies the size of one pixel of an image signal three-fold, and modifies the pixel in a fashion that RGB components are arranged laterally. The magnification/stripe formation circuit 11 supplies a resulting image signal to the resizing/resampling circuit 12. Then, the process proceeds to step S12.

In step S12, the resizing/resampling circuit 12 performs a process of resizing the image signal from the magnification/stripe formation circuit 11 in accordance with an output image size and resampling it. The process proceeds to step S13. In step S13, the resizing/resampling circuit 12 outputs an image signal obtained in the processing of step S12 to the monitor 2.

Next, an explanation will be given of the color shift addition process (process for reproducing color shift caused by a moving image) in the color shift addition process, spatial dither addition process, temporal dither addition process, inter-pixel pitch reproduction process, or stripe array reproduction process performed in the image processing unit 1.

Figure 5:
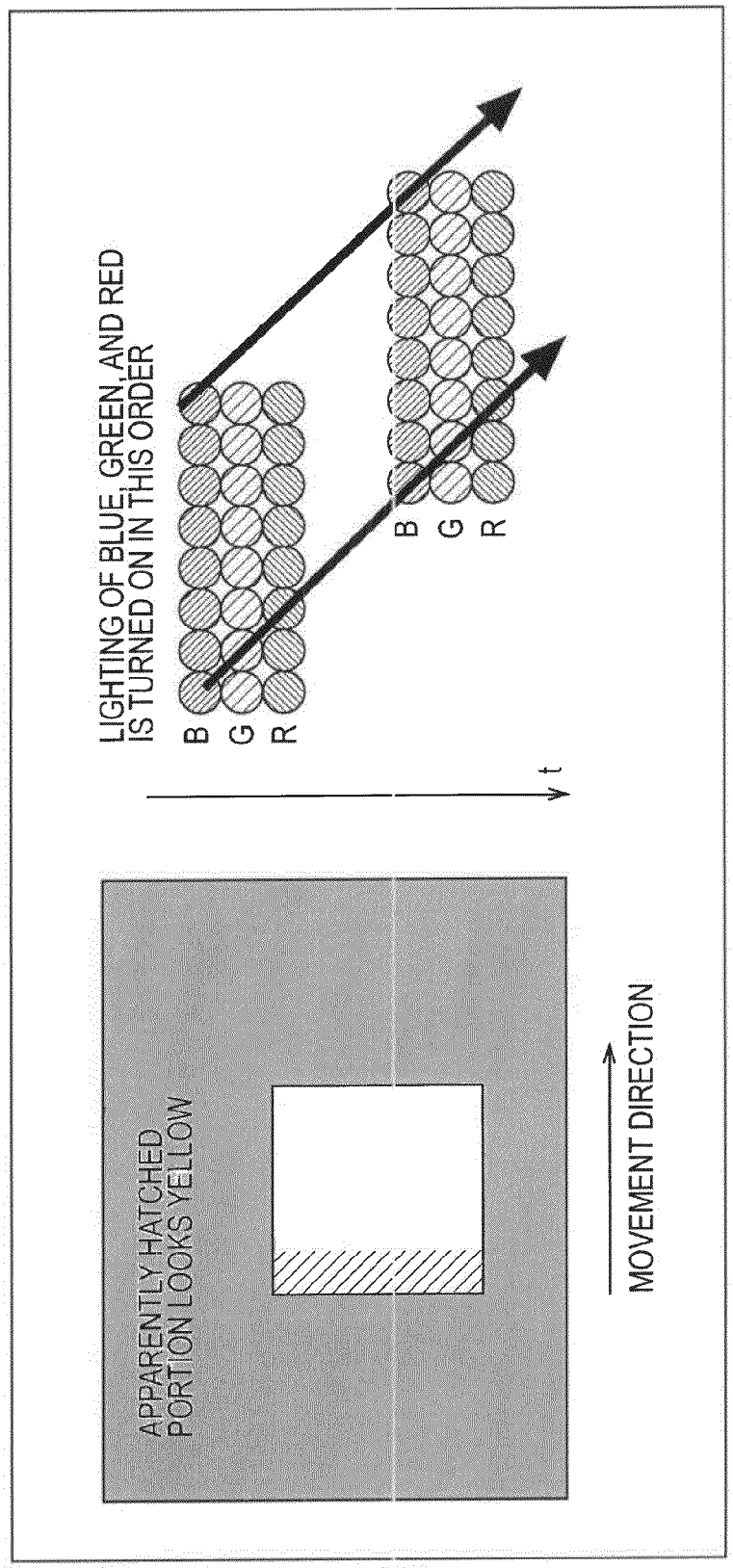
FIG. 5 is a diagram explaining color shift caused in an image to be displayed on a PDP.

FIG. 5 is a diagram explaining color shift that occurs in an image to be displayed on a PDP.

PDPs have a characteristic in that, depending on the difference in the lighting duration of RGB components, as is particularly noticeable for a white object which moves horizontally, if a person follows this object with the eye, colors look shifted.

In the color shift addition process, this characteristic is reproduced also with the monitor 2 such as a liquid crystal panel. The reproduction is performed by the following procedure.

1. Object Boundary Detection

The boundary of an object is detected from an image using edge detection or the like. In particular, a white object or the like is selected as a target.

2. Movement Amount Extraction

A movement amount of the object determined in the procedure of item 1 above with respect to a subsequent frame is determined. A technique such as the block matching method is used.

3. Addition of Color Shift

Optimum color shift is added in accordance with the RGB light emission characteristics of the PDP on which reproduction is to be performed and the movement amount of the object.

The amount of addition of color shift is decided depending on the light emission characteristics of the PDP to be matched with the movement amount.

For example, in the case of a characteristic in which the lighting of blue (B) is turned off earlier than the lighting of green (G) by a duration of 1/3 fr (fr is a frame period), a pixel value near an edge has a blue color component set to 2/3.

Similarly, an adjacent pixel value can be generated by reducing the subtraction of the blue component so as to cause color shift having a width corresponding to the moving amount.

FIG. 6 represents coefficients to be multiplied with the original pixel values in a PDP having a characteristic that the lighting of blue is turned off earlier than that of green by a duration of 1/3 fr in order to add color shift caused in a case where the moving amount of an object appearing on an image accounts for three pixels.

Figure 7:
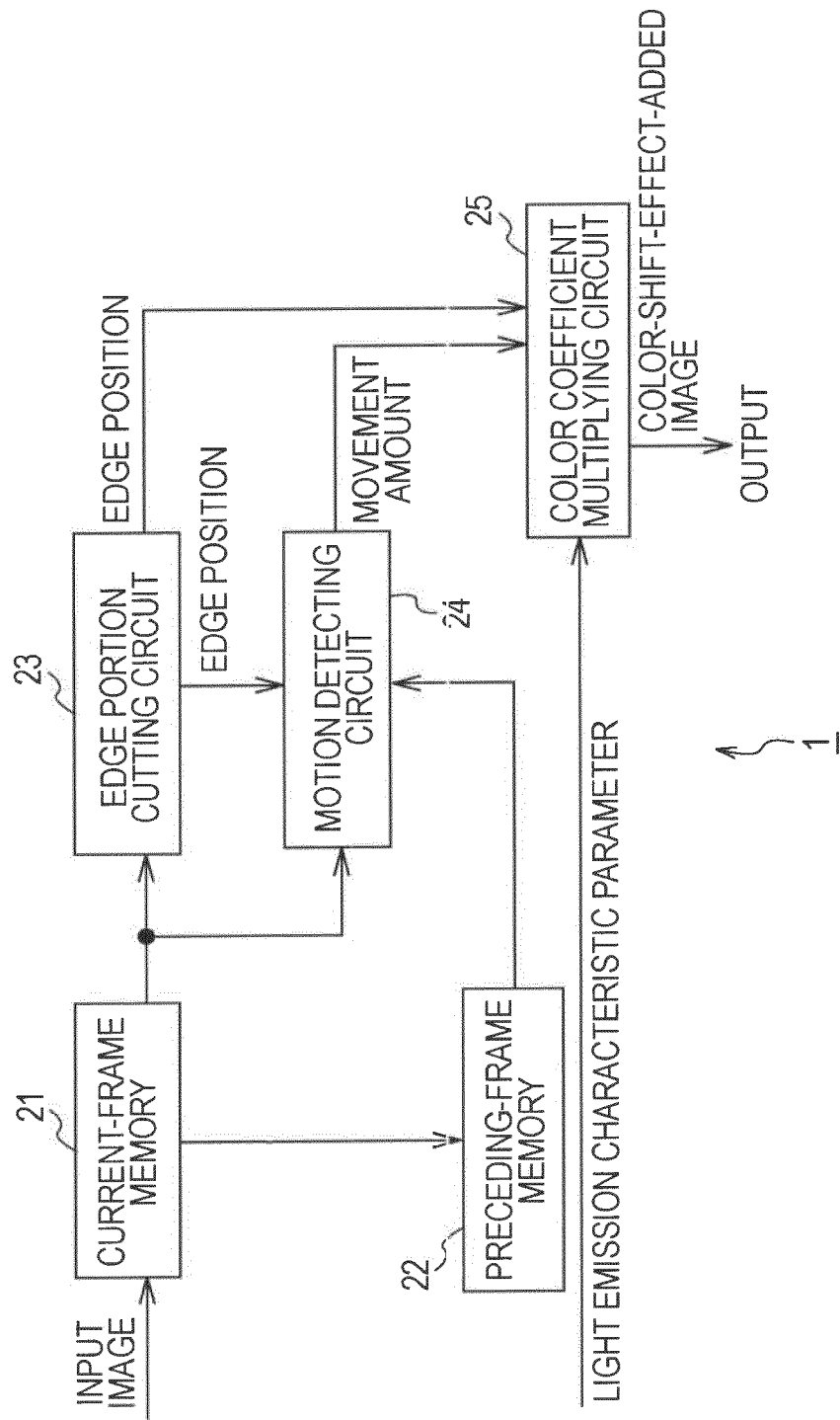
FIG. 7 is a block diagram illustrating an example structure of an image processing unit 1 for performing a color shift addition process.

FIG. 7 illustrates an example structure of an image processing unit 1 for performing the color shift addition process.

A current-frame memory 21 stores an image signal supplied to the image processing unit 1, and supplies the image signal as the image signal of the current frame to a preceding-frame memory 22, an edge portion cutting circuit 23, and a motion detecting circuit 24.

The preceding-frame memory 22 stores the image signal of the current frame supplied from the current-frame memory 21, and delays the image signal by a duration corresponding to one frame before supplying the image signal to the motion detecting circuit 24. Therefore, when the image signal of the current frame is supplied from the current-frame memory 21 to the motion detecting circuit 24, the image signal of the preceding frame, which is one frame preceding the current frame, is supplied from the preceding-frame memory 22 to the motion detecting circuit 24.

The edge portion cutting circuit 23 detects an edge portion of the image signal of the current frame from the current-frame memory 21, and supplies the edge position of this edge portion to the motion detecting circuit 24 and a color coefficient multiplying circuit 25. Furthermore, the edge portion cutting circuit 23 also supplies the image signal of the current frame from the current-frame memory 21 to the color coefficient multiplying circuit 25.

The motion detecting circuit 24 calculates a movement amount between the frames at the specified position from the edge portion cutting circuit 23, and outputs the movement amount to the color coefficient multiplying circuit 25.

That is, the motion detecting circuit 24 detects a movement amount of the edge portion at the edge position from the edge portion cutting circuit 23 using the image signal of the current frame from the current-frame memory 21 and the image signal from the preceding-frame memory 22, and supplies the movement amount to the color coefficient multiplying circuit 25.

The color coefficient multiplying circuit 25 generates, in coordination with the light emission characteristics (of the PDP) specified, a coefficient for adding color shift in accordance with the movement amount at the specified position, and multiplies the image by the coefficient, which is then output.

That is, the color coefficient multiplying circuit 25 is configured to be supplied with a light emission characteristic parameter representing the light emission characteristics (display characteristics) of the PDP.

The color coefficient multiplying circuit 25 determines a coefficient for causing color shift in accordance with the light emission characteristics represented by the light emission characteristic parameter, the position from the edge position (the position of a pixel) from the edge portion cutting circuit 23, and the movement amount of the edge portion from the motion detecting circuit 24. The color coefficient multiplying circuit 25 outputs an image signal of a color obtained by multiplying (a pixel value of) the image signal from the edge portion cutting circuit 23 by the coefficient. Then, the image signal output from the color coefficient multiplying circuit 25 is supplied to the monitor 2 and is displayed.

Figure 8:
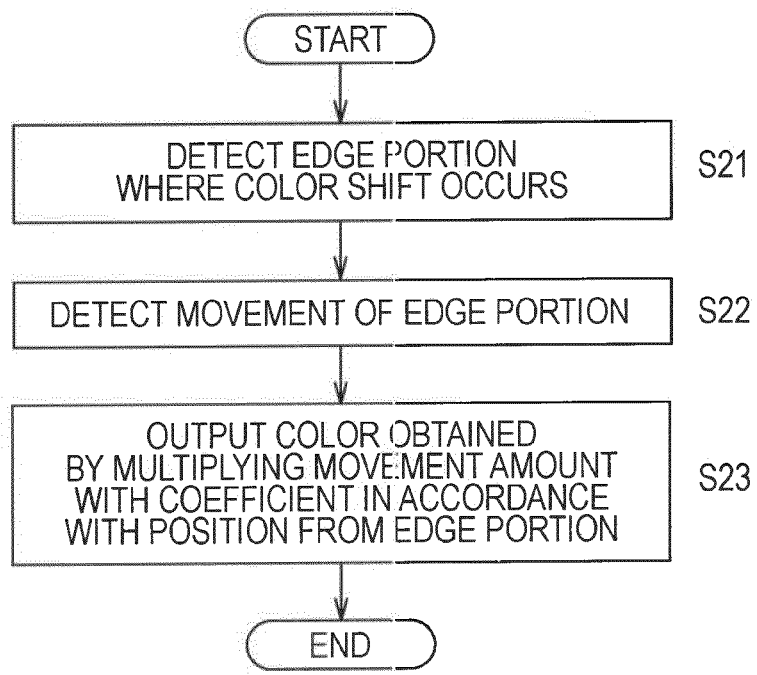
FIG. 8 is a flowchart explaining a color shift addition process.

FIG. 8 is a flowchart explaining the color shift addition process performed in the image processing unit 1 of FIG. 7.

In step S21, the edge portion cutting circuit 23 detects an edge portion where color shift occurs from the image signal of the current frame from the current-frame memory 21, and supplies the edge position of this edge portion to the motion detecting circuit 24 and the color coefficient multiplying circuit 25. Additionally, the edge portion cutting circuit 23 supplies the image signal of the current frame to the color coefficient multiplying circuit 25. Then, the process proceeds to step S22.

In step S22, the motion detecting circuit 24 detects a movement amount of the edge portion at the edge position from the edge portion cutting circuit 23 using the image signal of the current frame from the current-frame memory 21 and the image signal of the preceding-frame memory 22, and supplies the movement amount to the color coefficient multiplying circuit 25. Then, the process proceeds to step S23.

In step S23, the color coefficient multiplying circuit 25 determines a coefficient for causing color shift in accordance with the light emission characteristics represented by the light emission characteristic parameter, the movement amount of the edge portion from the motion detecting circuit 24, and the position from the edge portion at the edge position from the edge portion cutting circuit 23. Then, the color coefficient multiplying circuit 25 multiplies a color (pixel value) of each pixel of the image signal of the current frame from the edge portion cutting circuit 23 by the coefficient, and outputs the image signal of the color obtained as a result of the multiplication to the monitor 2.

Next, an explanation will be given of the inter-pixel pitch reproduction process (process for reproducing a pixel pitch at the time of reproduction of the same size) in the color shift addition process, spatial dither addition process, temporal dither addition process, inter-pixel pitch reproduction process, or stripe array reproduction process performed in the image processing unit 1.

In a case where the reproduction of the size of a target PDP is also to be realized, an equivalent size can be obtained using an electronic zoom function such as DRC (Digital Reality Creation). Additionally, more accurate matching of appearances can be achieved by reproducing a space between pixel pitches.

Here, DRC is described in, for example, Japanese Unexamined Patent Application Publication No. 2005-236634, Japanese Unexamined Patent Application Publication No. 2002-223167, or the like as a class classification adaptive process.

It is assumed that, for example, the size of the PDP to be matched is two-fold. In this case, two-fold electronic zoom can be used to provide the appearance of the same size. More improved reproducibility is realized by also adding the visual effect of gaps between pixels, which is specific to large-screen PDPs.

In the case of two-fold, an effect as illustrated in FIG. 9 may be added.

Figure 10:
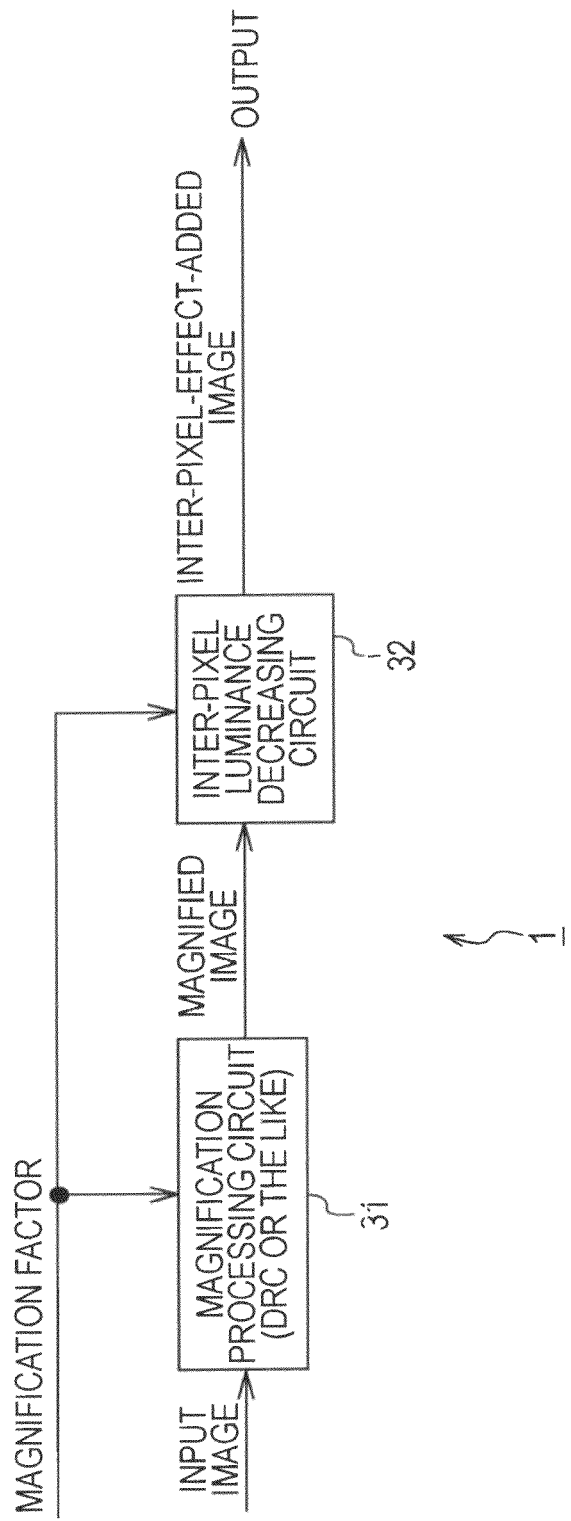
FIG. 10 is a diagram illustrating an example structure of an image processing unit 1 for performing an inter-pixel pitch reproduction process.

FIG. 10 illustrates an example structure of an image processing unit 1 for performing the inter-pixel pitch reproduction process.

A magnification processing circuit 31 magnifies an image signal supplied to the image processing unit 1 to an output image size. That is, the magnification processing circuit 31 performs a process of magnifying a portion of an image in accordance with a magnification factor supplied thereto. A magnified image obtained as a result of the process is output to an inter-pixel luminance decreasing circuit 32.

The inter-pixel luminance decreasing circuit 32 performs a process of reducing a luminance value with respect to a position where a gap between pixels exists in accordance with a magnification factor supplied thereto. That is, the inter-pixel luminance decreasing circuit 32 processes the image signal from the magnification processing circuit 31 so as to reduce the luminance of a portion where a space between pixels exists. The image signal obtained as a result of this process is output to the monitor 2.

Figure 11:
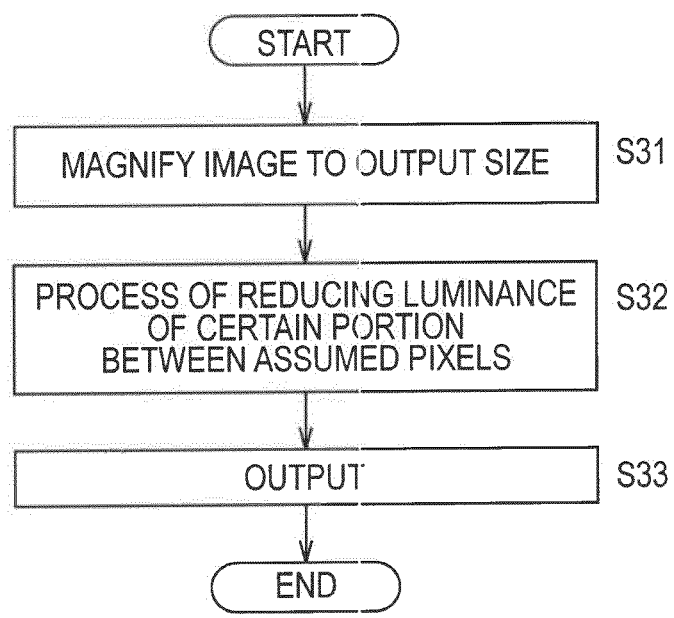
FIG. 11 is a flowchart explaining an inter-pixel pitch reproduction process.

FIG. 11 is a flowchart explaining the inter-pixel pitch reproduction process performed in the image processing unit 1 of FIG. 10.

In step S31, the magnification processing circuit 31 magnifies an image to an output image size, and supplies a resulting image to the inter-pixel luminance decreasing circuit 32. Then, the process proceeds to step S32. In step S32, the inter-pixel luminance decreasing circuit 32 performs a process of reducing the luminance of a certain portion between assumed pixels with respect to the image from the magnification processing circuit 31. Then, the process proceeds from step S32 to step S33, in which the inter-pixel luminance decreasing circuit 32 outputs an image obtained in step S32 to the monitor 2.

Next, an explanation will be given of the spatial dither addition process (process for reproducing a spatial dither pattern) in the color shift addition process, spatial dither addition process, temporal dither addition process, inter-pixel pitch reproduction process, or stripe array reproduction process performed in the image processing unit 1.

In many PDP panels, dithering is used in order to ensure color gradation levels (colors are arranged in a mosaic pattern to provide a pseudo-increase in gradation levels).

The reproduction of this dither pattern allows more accurate matching of appearances.

Figure 12:
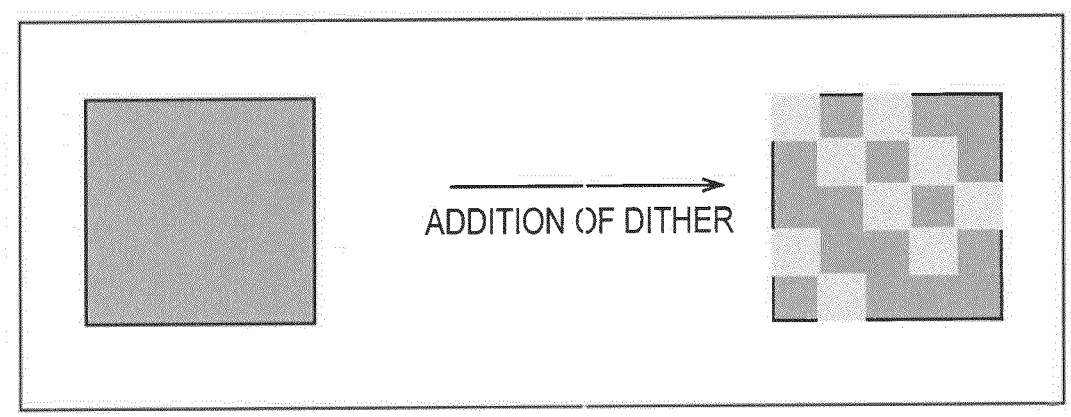
FIG. 12 is a diagram explaining a spatial dither addition process.

A target PDP panel has a color in which dithering is visible. In a portion with a small amount of color change within a screen, a color that matches this dithering-visible color can be reproduced by, as illustrated in FIG. 12, performing a process of adding dither.

Figure 13:
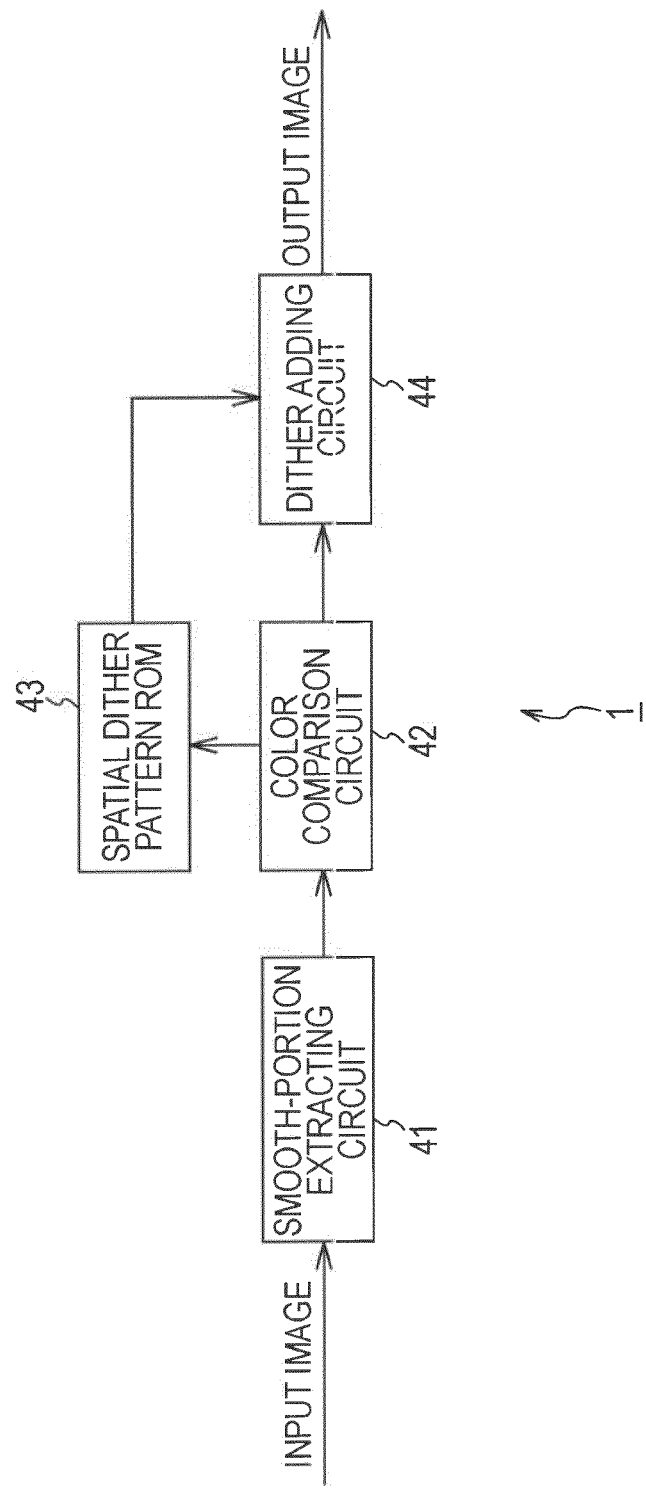
FIG. 13 is a block diagram illustrating an example structure of an image processing unit 1 for performing a spatial dither addition process.

FIG. 13 illustrates an example structure of an image processing unit 1 for performing the spatial dither addition process.

A smooth-portion extracting circuit 41 extracts a smooth part (smooth portion) of an image signal supplied to the image processing unit 1, and supplies the smooth portion to a color comparison circuit 42 together with the image signal.

The color comparison circuit 42 determines whether or not the color of the smooth portion from the smooth-portion extracting circuit 41 is a color in which dithering is visible.

That is, the color comparison circuit 42 compares the color of the smooth portion extracted by the smooth-portion extracting circuit 41 with colors (represented by RGB values) registered in a lookup table stored in a spatial dither pattern ROM. In a case where the color of the smooth portion is a color other than a color associated with the spatial dither pattern "no pattern", which will be described below, among the colors registered in the lookup table, the color comparison circuit 42 determines that the color of the smooth portion is a color in which dithering is visible. Then, the color comparison circuit 42 supplies, together with this determination result, the image signal from the smooth-portion extracting circuit 41 to a dither adding circuit 44.

The lookup table is stored in a spatial dither pattern ROM 43.

Figure 14:
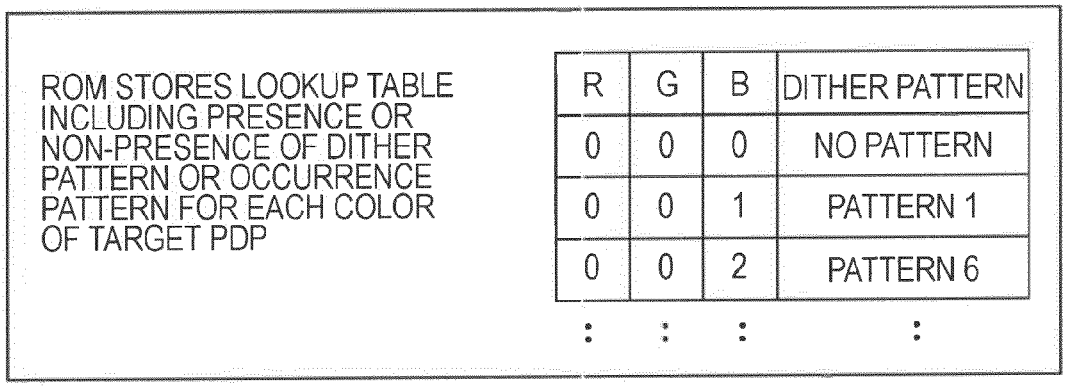
FIG. 14 is a diagram illustrating a lookup table stored in a spatial dither pattern ROM 43.

Here, FIG. 14 illustrates a lookup table stored in the spatial dither pattern ROM 43.

In the lookup table, an RGB value of each color is associated with a spatial dither pattern serving as a spatial dither pattern that can be easily seen when a color represented by this RGB value is displayed on the PDP.

Note that in the lookup table, for an RGB value of a color in which dithering is not visible, "no pattern" (indicating that dithering is not visible) is registered as a spatial dither pattern.

Also, in the color comparison circuit 42 (FIG. 13), it is determined that a color represented by an RGB value associated with the spatial dither pattern "no pattern" is not a color in which dithering is visible, and it is determined that other colors are colors in which dithering is visible.

Referring back to FIG. 13, the spatial dither pattern ROM 43 supplies a spatial dither pattern associated in the lookup table stored therein with an RGB value representing the color of the smooth portion that has been targeted for determination by the color comparison circuit 42, which is from the smooth-portion extracting circuit 41, to the dither adding circuit 44.

The dither adding circuit 44 adds the spatial dither represented by the spatial dither pattern specified from the spatial dither pattern ROM 43 to the image signal from the color comparison circuit 42.

That is, in a case where a determination result indicating that the color of the smooth portion is a color in which dithering is visible is supplied from the color comparison circuit 42, the dither adding circuit 44 adds the dither represented by the spatial dither pattern supplied from the spatial dither pattern ROM 43 to the image signal of the smooth portion of the image signal from the color comparison circuit 42, and outputs a result to the monitor 2.

Figure 15:
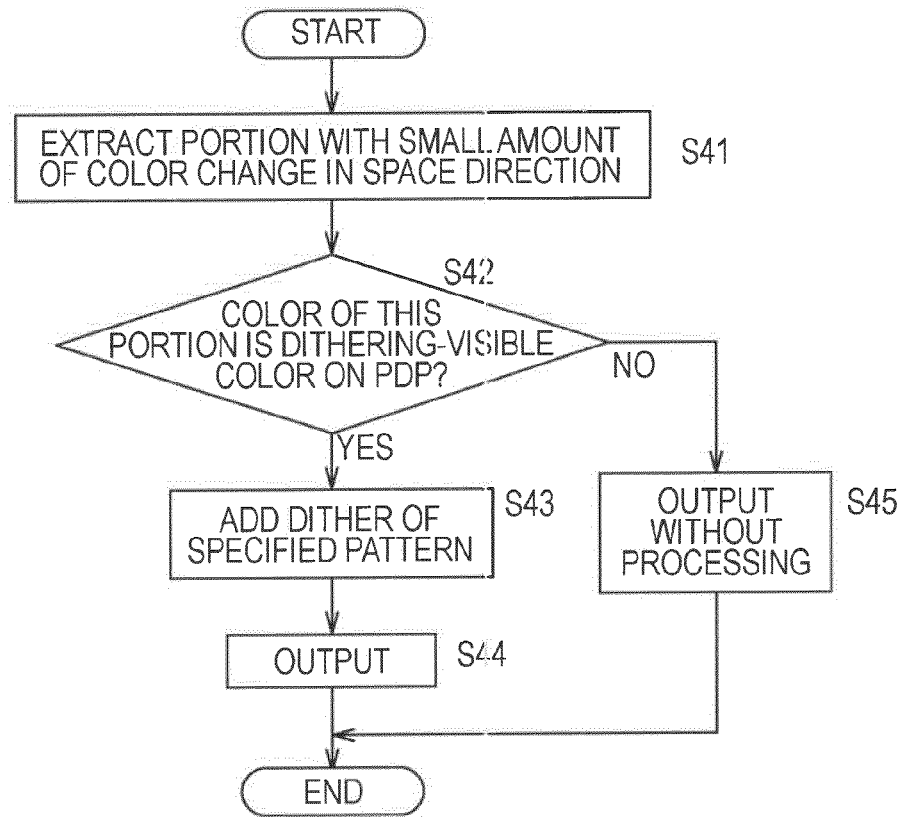
FIG. 15 is a flowchart explaining a spatial dither addition process.

FIG. 15 is a flowchart explaining the spatial dither addition process performed by the image processing unit 1 of FIG. 13.

In step S41, the smooth-portion extracting circuit 41 extracts a smooth portion that is a part with a small amount of color change in the space direction from the image signal, and supplies the smooth portion to the color comparison circuit 42 together with the image signal. Then, the process proceeds to step S42.

In step S42, the color comparison circuit 42 refers to the lookup table stored in the spatial dither pattern ROM 43, and determines whether or not the color of the smooth portion from the smooth-portion extracting circuit 41 is a dithering-visible color on the PDP.

In a case where it is determined in step S42 that the color of the smooth portion from the smooth-portion extracting circuit 41 is a dithering-visible color on the PDP, the color comparison circuit 42 supplies a determination result indicating this determination and the image signal from the smooth-portion extracting circuit 41 to the dither adding circuit 44. Additionally, the spatial dither pattern ROM 43 supplies the spatial dither pattern associated in the lookup table with the RGB value of the color of the smooth portion that has been targeted for determination by the color comparison circuit 42 to the dither adding circuit 44. Then, the process proceeds to step S43.

In step S43, the dither adding circuit 44 adds the specified pattern, that is, the spatial dither represented by the spatial dither pattern from the spatial dither pattern ROM 43, to the smooth portion of the image signal from the color comparison circuit 42. Then, the process proceeds to step S44. In step S44, the dither adding circuit 44 outputs the image signal with the dither added thereto to the monitor 2.

In contrast, in a case where it is determined in step S42 that the color of the smooth portion from the smooth-portion extracting circuit 41 is not a dithering-visible color on the PDP, the color comparison circuit 42 supplies a determination result indicating this determination and the image signal from the smooth-portion extracting circuit 41 to the dither adding circuit 44. Then, the process proceeds to step S45.

In step S45, the dither adding circuit 44 outputs the image signal from the color comparison circuit 42 directly to the monitor 2 without adding dither to the image signal.

Next, an explanation will be given of the temporal dither addition process (process for time-direction dither reproduction) in the color shift addition process, spatial dither addition process, temporal dither addition process, inter-pixel pitch reproduction process, or stripe array reproduction process performed in the image processing unit 1.

In PDP panels, dithering is also used in the time direction in order to ensure color gradation levels. Also in this case, reproducibility is improved by performing similar processing.

One frame of an input image is divided into the number of pieces that can be output at a speed equal to the response speed of a monitor to be used in accordance with a color, which are displayed. The method of division is to output a dither pattern obtained by performing the integration in the time direction of the PDP in which divisional pieces are to approach.

Figure 16:
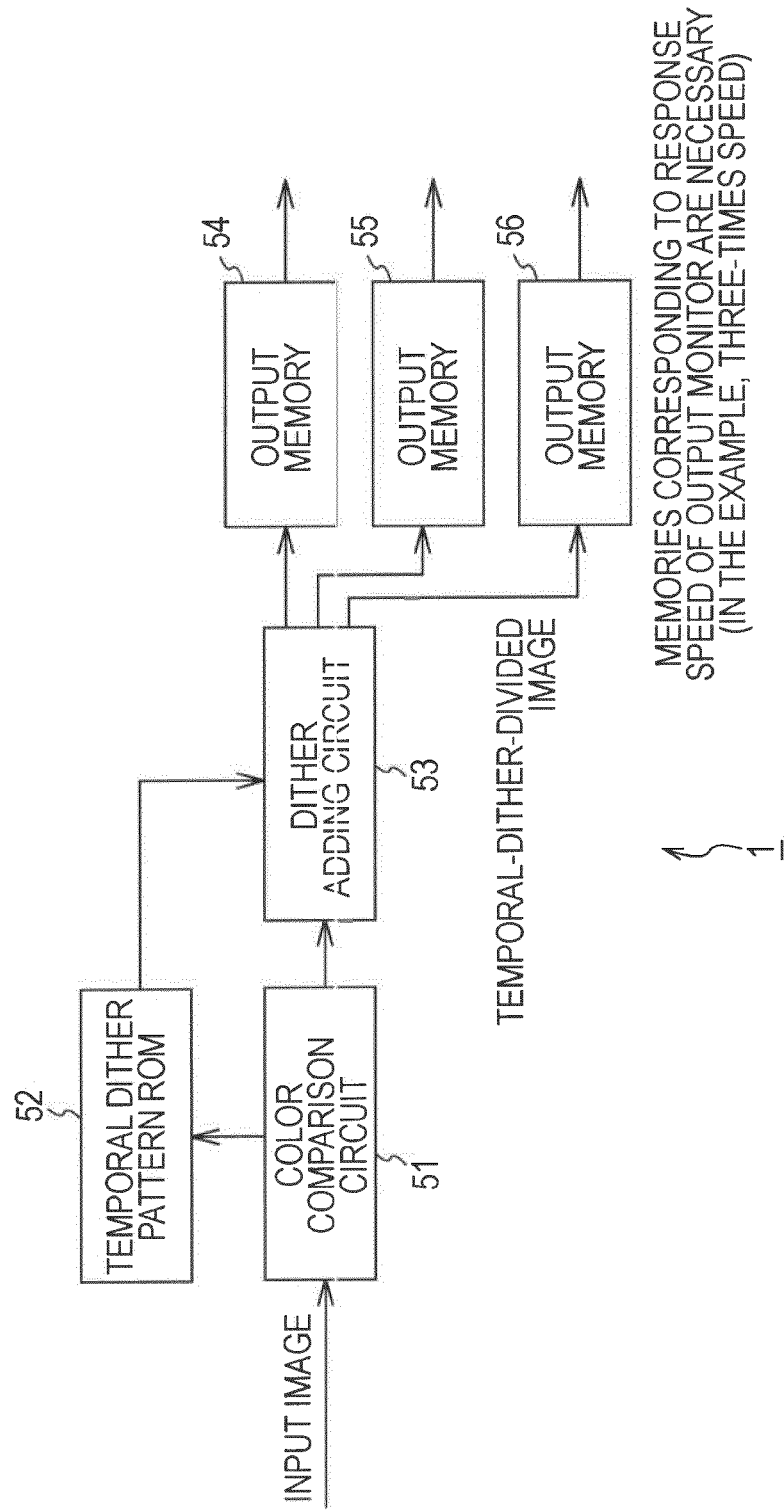
FIG. 16 is a block diagram illustrating an example structure of an image processing unit 1 for performing a temporal dither addition process.

FIG. 16 illustrates an example structure of an image processing unit 1 for performing the temporal dither addition process.

A color comparison circuit 51 compares a color of each pixel of an image signal of one frame supplied to the image processing unit 1 with (RGB values representing) colors registered in a lookup table stored in a temporal dither pattern ROM 52 to thereby determine whether or not the color of the pixel of the image signal is a color in which dithering is visible.

Then, in a case where the color of the image signal matches one of the colors registered in the lookup table, the color comparison circuit 51 determines that this color is a color in which dithering is visible. Then, the color comparison circuit 51 supplies, together with a determination result indicating this determination, the image signal of the frame to a dither adding circuit 44.

The temporal dither pattern ROM 52 stores a lookup table. In the lookup table stored in the temporal dither pattern ROM 52, (an RGB value representing) a color in which dithering is visible when displayed on the PDP and a temporal dither pattern that is a pixel value pattern of each sub-frame when this color is displayed at a plurality of sub-frames are registered in association with each other.

Here, the term sub-frame is equivalent to a sub-field that is used for display on a PDP.

Also, herein, it is assumed that the plurality of sub-frames described above are, for example, three sub-frames and that the monitor 2 has a performance capable of displaying at least three sub-frames for a period of one frame.

The temporal dither pattern ROM 52 supplies a temporal dither pattern associated in the lookup table stored therein with a color in which it has been determined by the color comparison circuit 51 dithering is visible, that is, information representing a set of individual pixel values of three sub-frames, to the dither adding circuit 53.

The dither adding circuit 53 divides (time-divides), for a color in which it has been determined dithering is visible, which is from the color comparison circuit 51, the image signal of one frame from the color comparison circuit 51 into three sub-frames of the pixel values represented by the temporal dither pattern supplied from the temporal dither pattern ROM 52, thereby adding a temporal dither pattern to the image signal of the frame from the color comparison circuit 51.

That is, adding a temporal dither pattern to an image signal of one frame means that an image signal of one frame is divided on a pixel-by-pixel basis into a plurality of sub-frames (here, three sub-frame) of the pixel values represented by the temporal dither pattern.

One image signal among the image signals of the three sub-frames obtained by adding the temporal dither pattern using the dither adding circuit 53 is supplied to an output memory 54, another image signal to an output memory 55, and the other image signal to an output memory 56.

Each of the output memories 54 to 56 stores the image signal of the sub-frame supplied from the dither adding circuit 53, and supplies the image signal to the monitor 2 at a timing for the sub-frame to be displayed.

Note that in the monitor 2, sub-frames are displayed in periods in which three sub-frames can be displayed within one frame, such as a period of ⅓ the frame period.

Here, in FIG. 16, the three output memories 54 to 56 are provided as memories for storing image signals of sub-frames. The same number of memories for storing image signals of sub-frames is required as the number of sub-frames that can be obtained by adding a temporal dither pattern using the dither adding circuit 53.

For example, in a case where the number of sub-frames that can be obtained by adding a temporal dither pattern using the dither adding circuit 53 is equal to a maximum number of sub-frames that can be displayed within one frame on the monitor 2 (the response speed of the monitor 2), a number of memories equal to that number are required as memories for storing image signals of sub-frames.

Figure 17:
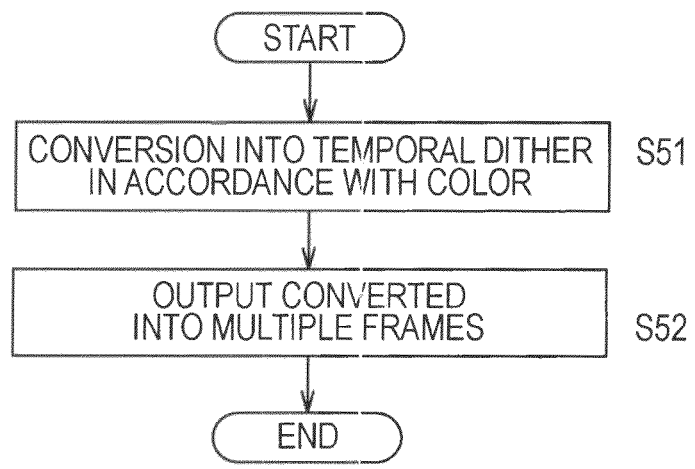
FIG. 17 is a flowchart explaining a temporal dither addition process.

FIG. 17 is a flowchart explaining the temporal dither addition process performed by the image processing unit 1 of FIG. 16.

The color comparison circuit 51 refers to the lookup table stored in the temporal dither pattern ROM 52 to determine whether or not a color of each pixel of an image signal of one frame supplied to the image processing unit 1 is a color in which dithering is visible, and supplies, together with a determination result obtained for this pixel, the image signal of that frame to the dither adding circuit 53.

In contrast, the temporal dither pattern ROM 52 supplies, for each pixel, to the dither adding circuit 53 a temporal dither pattern associated in the lookup table with a color in which it has been determined by the color comparison circuit 51 dithering is visible.

In step S51, the dither adding circuit 53 adds, for a color in which it has been determined dithering is visible, which is from the color comparison circuit 51, a temporal dither pattern to an image signal of one frame from the color comparison circuit 51. Then, the process proceeds to step S52.

That is, the dither adding circuit 53 divides an image signal of one frame from the color comparison circuit 51 into image signals of three sub-frames by dividing the pixel value of each pixel of the image signal of that frame into three pixel values, which are represented by the temporal dither pattern supplied from the temporal dither pattern ROM 52, and setting the three pixel values as the pixel values of individual pixels corresponding to the three sub-frames. Then, the dither adding circuit 53 supplies one image signal among the image signals of the three sub-frames to the output memory 54, another image signal to the output memory 55, and the other image signal to the output memory 56 for storage. Note that, for a pixel of a color in which dithering is not visible, for example, ⅓ the pixel value thereof can be set as the pixel value of a sub-frame.

In step S52, the output memories 54 to 56 output the image signals of the sub-frames stored in step S51 to the monitor 2 at timings for the sub-frames to be displayed.

Figure 18:
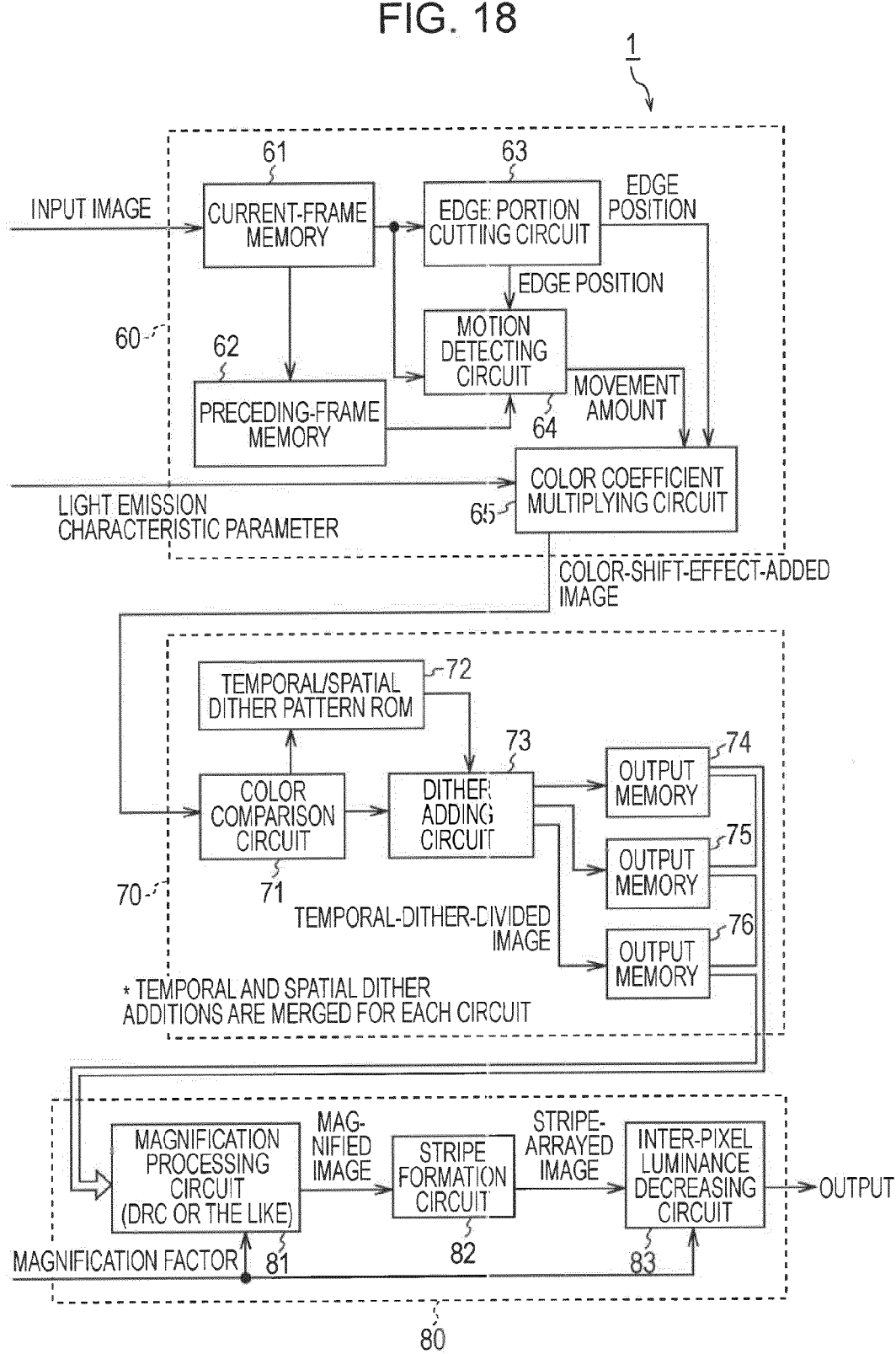
FIG. 18 is a block diagram illustrating an example structure of an image processing unit 1 for performing all a color shift addition process, a spatial dither addition process, a temporal dither addition process, an inter-pixel pitch reproduction process, and a stripe array reproduction process.

Next, FIG. 18 illustrates an example structure of an image processing unit 1 for performing all the color shift addition process, spatial dither addition process, temporal dither addition process, inter-pixel pitch reproduction process, and stripe array reproduction process.

In FIG. 18, the image processing unit 1 is constructed from image processing units 60, 70, and 80.

The image processing unit 60 is constructed from a current-frame memory 61, a preceding-frame memory 62, an edge portion cutting circuit 63, a motion detecting circuit 64, and a color coefficient multiplying circuit 65.

The current-frame memory 61 to the color coefficient multiplying circuit 65 are configured in a manner similar to that of the current-frame memory 21 to color coefficient multiplying circuit 25 of FIG. 7, respectively. Therefore, the image processing unit 60 subjects the image signal supplied to the image processing unit 1 to a color shift addition process similar to that in the case of FIG. 7, and supplies a resulting image signal to the image processing unit 70.

The image processing unit 70 is constructed from a color comparison circuit 71, a temporal/spatial dither pattern ROM 72, a dither adding circuit 73, and output memories 74 to 76.

The color comparison circuit 71 performs a process similar to that of each of the color comparison circuit 42 of FIG. 13 and the color comparison circuit 51 of FIG. 16 on the image signal supplied from the image processing unit 60.

The temporal/spatial dither pattern ROM 72 has stored therein a lookup table similar to each of the lookup table stored in the spatial dither pattern ROM 43 of FIG. 13 and the lookup table stored in the temporal dither pattern ROM 52 of FIG. 16. Based on the lookup tables, the temporal/spatial dither pattern ROM 72 performs a process similar to that of each of the spatial dither pattern ROM 43 of FIG. 13 and the temporal dither pattern ROM 52 of FIG. 16.

Like the dither adding circuit 44 of FIG. 13, the dither adding circuit 73 adds spatial dither represented by a spatial dither pattern to the image signal, and further adds a temporal dither pattern to the image signal. Accordingly, the dither adding circuit 73 divides that image signal into three sub-frames which are individually supplied to the output memories 74 to 76.

Like the output memories 54 to 56 of FIG. 16, the output memories 74 to 76 store the image signals of the sub-frames from the dither adding circuit 73. The image signals of the sub-frames stored in the output memories 74 to 76 are supplied to the image processing unit 80.

In the image processing unit 70 constructed as above, a spatial dither addition process similar to that in the case of FIG. 13 and a temporal dither addition process similar that in the case of FIG. 16 are performed on the image signal output from the image processing unit 60.

The image processing unit 80 is constructed from a magnification processing circuit 81, a stripe formation circuit 82, and an inter-pixel luminance decreasing circuit 83.

The magnification processing circuit 81 performs a process similar to that of the magnification processing circuit 31 of FIG. 10 on the image signal from the image processing unit 70, and supplies a resulting image signal to the stripe formation circuit 82.

The stripe formation circuit 82 performs, on the image signal from the magnification processing circuit 81, only a process for decomposition into a stripe array within the processing performed by the magnification/stripe formation circuit 11 of FIG. 3, and supplies a resulting image signal to the inter-pixel luminance decreasing circuit 83.

Therefore, a process similar to that performed by the magnification/stripe formation circuit 11 of FIG. 3 is performed using both the magnification processing circuit 81 and the stripe formation circuit 82.

The inter-pixel luminance decreasing circuit 83 performs a process similar to that performed by the inter-pixel luminance decreasing circuit 32 of FIG. 10 on the image signal from the stripe formation circuit 82, and outputs the image signal obtained as a result of the process to the monitor 2.

Therefore, in the image processing unit 80, a stripe array reproduction process similar to that in the case of FIG. 10 and an inter-pixel pitch reproduction process similar to that in the case of FIG. 13 are performed.

Note that in the image processing unit 80, the stripe array reproduction process and the inter-pixel pitch reproduction process are performed on each of the image signals of the three sub-frames supplied from the image processing unit 70.

Figure 19:
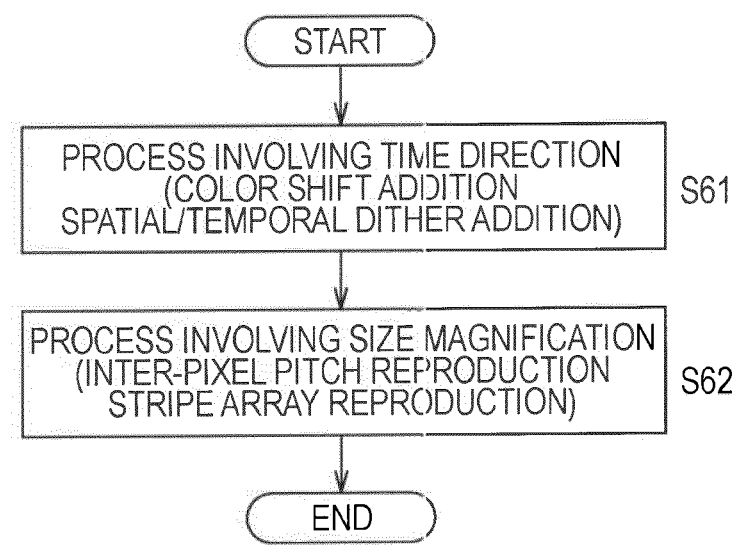
FIG. 19 is a flowchart explaining the process of the image processing unit 1.

FIG. 19 is a flowchart explaining the process of the image processing unit 1 of FIG. 18.

In step S61, a process involving a time direction is performed. That is, in step S61, the color shift addition process is performed in the image processing unit 60, and the spatial dither addition process and the temporal dither addition process are performed in the image processing unit 70.

Then, the process proceeds from step S61 to step S62, in which a process involving size magnification is performed. That is, in step S62, the inter-pixel pitch reproduction process and the stripe array reproduction process are performed in the image processing unit 80.

As above, the image processing unit 1 performs at least one of the color shift addition process, the spatial dither addition process, the temporal dither addition process, the inter-pixel pitch reproduction process, and the stripe array reproduction process. Thus, the appearance of an image on a PDP can be reproduced using a display other than a PDP, such as, for example, an LCD, by performing signal processing.

Also, the reproduction is performed by performing signal processing, whereby image quality evaluation or the like of a plasma display can be performed at the same time on the same screen of the same monitor.

Next, the series of processes described above can be performed by dedicated hardware or can be performed by software. In a case where the series of processes is performed by software, a program constituting the software is installed into a general-purpose computer or the like.

Thus, FIG. 20 illustrates an example structure of an embodiment of a computer into which a program that executes the series of processes described above is installed.

The program can be recorded in advance on a hard disk 105 or a ROM 103 serving as a recording medium incorporated in a computer.

Alternatively, the program can be temporarily or permanently stored (recorded) on a removable recording medium 111 such as a flexible disk, a CD-ROM (Compact Disc Read Only Memory), an MO (Magneto Optical) disk, a DVD (Digital Versatile Disc), a magnetic disk, or a semiconductor memory. The removable recording medium 111 of this type can be provided as so-called packaged software.

Note that the program can be, as well as installed into the computer from the removable recording medium 111 as described above, transferred to the computer from a download site in a wireless fashion via a satellite for digital satellite broadcasting or transferred to the computer in a wired fashion via a network such as a LAN (Local Area Network) or the Internet. In the computer, the program transferred in such a manner can be received by a communication unit 108 and installed into the hard disk 105 incorporated therein.

The computer incorporates therein a CPU (Central Processing Unit) 102. The CPU 102 is connected to an input/output interface 110 via a bus 101. When an instruction is input from a user through an operation or the like of an input unit 107 constructed with a keyboard, a mouse, a microphone, and the like via the input/output interface 110, the CPU 102 executes a program stored in the ROM (Read Only Memory) 103 according to the instruction. Alternatively, the CPU 102 loads onto a RAM (Random Access Memory) 104 a program stored in the hard disk 105, a program that is transferred from a satellite or a network, received by the communication unit 108, and installed into the hard disk 105, or a program that is read from the removable recording medium 111 mounted in a drive 109 and that is installed into the hard disk 105, and executes the program. Accordingly, the CPU 102 performs the processes according to the flowcharts described above or the processes performed by the structure of the block diagrams described above. Then, the CPU 102 causes this processing result to be, according to necessity, for example, output from an output unit 106 constructed with an LCD (Liquid Crystal Display), a speaker, and the like via the input/output interface 110, sent from the communication unit 108, or recorded or the like onto the hard disk 105.

Here, in this specification, processing steps describing a program for causing a computer to perform various processes may not necessarily be processed in time sequence in accordance with the order described as the flowcharts, and include processes executed in parallel or individually (for example, parallel processes or object-based processes).

Further, the program may be processed by one computer or may be processed in a distributed fashion by a plurality of computers. Furthermore, the program may be transferred to a remote computer and executed thereby.

Note that embodiments of the present invention are not limited to the embodiments described above, and a variety of modifications can be made without departing from the scope of the present invention.

The invention claimed is:

1. An image signal processing apparatus for processing an image signal so that an image obtained when the image signal is displayed on a display apparatus of a display type other than that of a PDP (Plasma Display Panel) looks like an image displayed on a PDP display apparatus, comprising at least one of:

means for reproducing a dither pattern to be applied in a space direction and adding the dither pattern to be applied in the space direction to the image signal; and means for reproducing a dither pattern to be applied in a time direction and adding the dither pattern to be applied in the time direction to the image signal, wherein the image signal processing apparatus further comprises means for storing presence or absence of at least one of the dither pattern to be applied in the space direction and the dither pattern to be applied in the time direction for each RGB (Red, Green, and Blue) color pattern.

2. An image signal processing apparatus for processing an image signal so that an image obtained when the image signal is displayed on a display apparatus of a display type other than that of a PDP (Plasma Display Panel) looks like an image displayed on a PDP display apparatus, the image signal processing apparatus comprising:

means for reproducing color shift caused by a moving image displayed on the PDP display apparatus, the means for reproducing color shift including means for detecting an edge portion of the image signal, means for detecting a movement amount of the edge portion, and means for outputting a color obtained by multiplying a position from the edge portion and a coefficient according to the movement amount.

3. The image signal processing apparatus according to claim 1, wherein the image signal processing apparatus comprises at least the means for reproducing the dither pattern to be applied in the space direction and the means for reproducing the dither pattern to be applied in the space direction includes means for extracting a smooth portion of the image signal, means for determining whether or not a color of the smooth portion is a color in which dithering is visible, and means for adding a spatial dither pattern to the image signal in a case where the color of the smooth portion is a color in which dithering is visible.

4. The image signal processing apparatus according to claim 1, wherein the image signal processing apparatus comprises at least the means for reproducing the dither pattern to be applied in the time direction and the means for reproducing the dither pattern to be applied in the time direction includes means for determining whether or not a color of a pixel of the image signal is a color in which dithering is visible, and means for adding a temporal dither pattern to the image signal by time-dividing the image signal into a plurality of image signals in accordance with the color in which dithering is visible.

5. An image signal processing apparatus for processing an image signal so that an image obtained when the image signal is displayed on a display apparatus of a display type other than that of a PDP (Plasma Display Panel) looks like an image displayed on a PDP display apparatus, the image signal processing apparatus comprising:

means for reproducing a space between pixel pitches, the means for reproducing the space including means for magnifying the image signal to an output image size, and means for reducing a luminance of a portion where a space between pixels exists.

6. An image signal processing apparatus for processing an image signal so that an image obtained when the image signal is displayed on a display apparatus of a display type other than that of a PDP (Plasma Display Panel) looks like an image displayed on a PDP display apparatus, the image signal processing apparatus comprising:

means for reproducing a stripe array the means for reproducing the stripe array including means for magnifying the image signal, decomposing the magnified image signal into a stripe array, and outputting a stripe-formed image signal, and means for resampling the stripe-formed image signal in accordance with an output image size and outputting a resulting image signal.

7. An image signal processing apparatus for processing an image signal so that an image obtained when the image signal is displayed on a display apparatus of a display type other than that of a PDP (Plasma Display Panel) looks like an image displayed on a PDP display apparatus, comprising at least one of:

a spatial dither adding unit configured to reproduce a dither pattern to be applied in a space direction and to add the dither pattern to be applied in the space direction to the image signal;

a temporal dither adding unit configured to reproduce a dither pattern to be applied in a time direction and to add the dither pattern to be applied in the time direction to the image signal, wherein the image signal processing apparatus further comprises a storage unit configured to store presence or absence of at least one of the dither pattern to be applied in the space direction and the dither pattern to be applied in the time direction for each RGB (Red, Green, and Blue) color pattern.

8. An image signal processing apparatus for processing an image signal so that an image obtained when the image signal is displayed on a display apparatus of a display type other than that of a PDP (Plasma Display Panel) looks like an image displayed on a PDP display apparatus, the image signal processing apparatus comprising:

a color shift adding unit configured to reproduce color shift caused by a moving image displayed on the PDP display apparatus, the color shift adding unit including an edge portion detecting unit configured to detect an edge portion of the image signal, a motion detecting unit configured to detect a movement amount of the edge portion, and a color coefficient multiplying unit configured to output a color obtained by multiplying a position from the edge portion and a coefficient according to the movement amount.

9. The image signal processing apparatus according to claim 7, wherein the image signal processing apparatus comprises at least the spatial dither adding unit and the spatial dither adding unit includes a smooth-portion extracting unit configured to extract a smooth portion of the image signal, a determination unit configured to determine whether or not a color of the smooth portion is a color in which dithering is visible, and an adding unit configured to add a spatial dither pattern to the image signal in a case where the color of the smooth portion is a color in which dithering is visible.

10. The image signal processing apparatus according to claim 7, wherein the image signal processing apparatus comprises at least the temporal dither adding unit and the temporal dither adding unit includes a determining unit configured to determine whether or not a color of a pixel of the image signal is a color in which dithering is visible, and an adding unit configured to add a temporal dither pattern to the image signal by time-dividing the image signal into a plurality of image signals in accordance with the color in which dithering is visible.

11. An image signal processing apparatus for processing an image signal so that an image obtained when the image signal is displayed on a display apparatus of a display type other than that of a PDP (Plasma Display Panel) looks like an image displayed on a PDP display apparatus, the image signal processing apparatus comprising:

an inter-pixel pitch reproducing unit configured to reproduce a space between pixel pitches, the inter-pixel pitch reproducing unit including an image signal magnifying unit configured to magnify the image signal to an output image size, and an inter-pixel luminance decreasing unit configured to reduce a luminance of a portion where a space between pixels exists.

12. An image signal processing apparatus for processing an image signal so that an image obtained when the image signal is displayed on a display apparatus of a display type other than that of a PDP (Plasma Display Panel) looks like an image displayed on a PDP display apparatus, the image signal processing apparatus comprising:

a stripe array reproducing unit configured to reproduce a stripe array, the stripe array reproducing unit including a stripe forming unit configured to magnify the image signal, decompose the magnified image signal into a stripe array, and output a stripe-formed image signal, and a resizing/resampling unit configured to resample the stripe-formed image signal in accordance with an output image size and output a resulting image signal.

\* \* \* \* \*